(12) United States Patent
Grinchuk (10) Patent No.: US 7,185,039 B2
(45) Date of Patent: Feb. 27, 2007

(54) MULTIPLIER FOR MODULAR EXPONENTIATION

(75) Inventor: Mikhail I. Grinchuk, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 680 days.

(21) Appl. No.: 10/441,651

(22) Filed: May 19, 2003

(65) Prior Publication Data

US 2004/0236813 A1 Nov. 25, 2004

(51) Int. Cl.
*G06F 7/72* (2006.01)
(52) U.S. Cl. .................................... 708/491
(58) Field of Classification Search ............... None
See application file for complete search history.

(56) References Cited

U.S. PATENT DOCUMENTS

| | | | |
|---|---|---|---|
| 5,742,530 A * | 4/1998 | Gressel et al. | 708/491 |
| 6,209,016 B1 * | 3/2001 | Hobson et al. | 708/491 |
| 6,598,061 B1 * | 7/2003 | Symes et al. | 708/491 |
| 6,748,410 B1 * | 6/2004 | Gressel et al. | 708/491 |
| 7,035,889 B1 * | 4/2006 | Carlson et al. | 708/491 |
| 7,046,800 B1 * | 5/2006 | Tenca et al. | 380/28 |

OTHER PUBLICATIONS

A.J. Mezenes; Handbook of Applied Cryptography; P.C. van Oorshot, and S.A. Vanstone, CRC Press, 1996, pp. 591-634.

* cited by examiner

*Primary Examiner*—D. H. Malzahn
(74) *Attorney, Agent, or Firm*—Eric James Whitesell (57) ABSTRACT

A method of modular exponentiation includes receiving as input a first number, a second number, and a modulus for calculating a residue of a product of the first number times the second number modulo the modulus; partitioning the first number into a selected number of pieces; calculating a first product of one of the pieces times the second number; adding a previous intermediate result to the first product to generate a first sum; shifting the first sum by a selected number of bit positions to generate a second product; and reducing a bit width of the second product to generate an intermediate result wherein the intermediate result has a bit width that is less than a bit width of the second product and has a residue that is identical to a residue of the second product modulo the modulus.

9 Claims, 6 Drawing Sheets

MULTIPLIER FOR MODULAR EXPONENTIATION

FIELD OF THE INVENTION

The present invention relates generally to methods and devices for solving formulas. More specifically, but without limitation thereto, the present invention relates to methods and devices for solving formulas having the form $A^B$ mod M.

BACKGROUND OF THE INVENTION

The present invention is directed to methods and devices for solving formulas having the form $A^B$ mod M, where A, B, and M are generally large numbers of the order $2^N$, N having a typical value of 1024. These modular exponential formulas are frequently used in RSA security modules for Internet protocols. To increase the speed of calculation of modular exponential formulas, several approaches have been developed, for example, the Montgomery algorithm. Other algorithms are described in *Handbook of Applied Cryptography*, A. J. Mezenes, P. C. van Oorschot, and S. A. Vanstone, CRC Press, 1996, pp. 591–634.

The Montgomery algorithm is a modular multiplication algorithm in which one reduction is performed at each iteration of the multiplication. An advantage of the Montgomery algorithm is that the modular reduction is performed by a shift instead of a division. However, further speed increases for modular exponentiation are desirable for more efficient secure communications.

SUMMARY OF THE INVENTION

In one aspect of the present invention, a method of modular exponentiation includes receiving as input a first number, a second number, and a modulus for calculating a residue of a product of the first number times the second number modulo the modulus; partitioning the first number into a selected number of pieces; calculating a first product of one of the pieces times the second number; adding a previous intermediate result to the first product to generate a first sum; shifting the first sum by a selected number of bit positions to generate a second product; and reducing a bit width of the second product to generate an intermediate result wherein the intermediate result has a bit width that is less than a bit width of the second product and has a residue that is identical to a residue of the second product modulo the modulus.

DESCRIPTION OF THE DRAWINGS

The present invention is illustrated by way of example and not limitation in the accompanying figures, in which like references indicate similar elements throughout the several views of the drawings, and in which.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

DESCRIPTION OF THE ILLUSTRATED EMBODIMENTS

Modular exponential formulas having the form $A^B$ mod M, where A, B, and M are generally large numbers of the order $2^N$, N being an integer having a typical value of 1024, are frequently used in RSA security modules for Internet protocols. Typically, exponentiation is implemented as sequential multiplications and squarings, so that the most primitive operation is multiplication. Instead of standard algorithms for modular multiplication of the form A=B*C (mod M), where A, B, C, and M all have N bits, it is possible to use larger numbers B' and C' of the order $2^{N'}$, where N' is an integer greater than N. If B' and C' have N' bits, and if an N'-bit value may be computed for A'=mul(B',C',M) such that A' is an output of the algorithm mul having more than N bits and satisfying A'=A (mod M), then the operation mul may be used instead of standard modular multiplication everywhere in most exponentiation algorithms. For example, to compute the formula P*Q*R*S (mod M) where P, Q, R, S, and M all are all N-bit numbers, then the following steps would be performed in a standard modular multiplication:

(a) multiply P*Q to generate product X1
(b) calculate residue Y1=X1 mod M
(c) multiply R*S to generate product X2
(d) calculate residue Y2=X2 mod M
(e) multiply Y1*Y2 to generate product X3
(f) calculate residue Y3=X3 mod M In contrast to standard modular multiplication, the operation mul may be used to find the residue Y3 as follows:

(a) calculate Z1=mul(P,Q,M)
(b) calculate Z2=mul(R,S,M)
(c) calculate Z3=mul(Z1,Z2,M)
(d) calculate Y3=Z3 mod M In the final modular reduction step, the output value of the last multiplication is converted in modulo M arithmetic from an N'-bit value to an N-bit value. This method affords the following advantages:

(1) Almost all complexity is concentrated in a single relatively "thin" multiplier, approximately N by N/K bits, which may be readily designed and implemented; and (2) The thin multiplier performs almost all the necessary calculations, requiring approximately 2K clock cycles to execute each modular multiplication. By comparison, the Montgomery algorithm requires 3K clock cycles or two separate multipliers (N by N/K and N/K by N/K) plus additional registers to store intermediate results.

In one embodiment of the present invention, the operator mul(B',C',M) is constructed as follows. An integer N' is defined as the sum of a series N1+N2 + ... + N2+N3, where N2 is repeated K−2 times, K is an integer greater than or equal to 4 and is selected to be as small as possible given the chip size constraints, and N1, N2, and N3 are positive integers. A number B' having N' bits is split into K pieces B[1], ..., B[K]. Each piece B[i] has a corresponding bit width L[i], where L[1]=N1, L[2]=N2, ..., L[K−1]=N2, and L[K]=N3 such that:

$$B' = B[1]*2^{L[2]+ \ldots +L[K]} + B[2]*2^{L[3]+ \ldots +L[K]} + \ldots + B[K-1]*2^{L[K]} + B[K] \quad (1)$$

The calculation of the residue B'*C' (mod M) may be simplified by introducing five pre-computed N-bit values D1, ..., D5 having the form $2^n$ mod M, where n does not depend on the value of B', C', or M. The residue B'*C' (mod M) may then be calculated as a sequence of K+1 steps: S[1], S[2], ..., S[K], S[K+1]. Each of the steps S[1], S[2], ..., S[K], S[K+1] is one of five different types. Steps S[2], ..., S[K−2] all share a common structure, while steps S[1], S[K−1], S[K], and S[K+1] each have a different structure. Each step S[1], ..., S[K] contains two multiplications having the form P=Q*R+S, where Q is an N'-bit number and R is a number having a bit width less than N', while step S[K+1] contains only one multiplication having the form P=Q*R+S.

Step S[1] has inputs B[1], C', and D1. The output of Step S[1] is X[1].

Steps S[i], 1<i <=K−2, have inputs B[i], C', D2, and X[i−1]. The output of Step S[i] is X[i].

Step S[K−1] has inputs B[K−1], C', D3, and X[K−2]. The output of Step S[K−1] is X[K−1].

Step S[K] has inputs B[K], C', D4, and X[K−1]. The output of Step S[K] is X[K].

Step S[K+1] has inputs D5 and X[K]. The output of Step S[K+1] is X[K+1]. The value of X[K+1] is the output of the operation mul.

The bit width of intermediate outputs X[1], ... X[K−2] may be expressed as R1, of X[K−1] as R2, and of X[K] as R3. Because the output X[K+1] is the final output of the operation mul, it has a bit width of N'.

The value of each intermediate output X[i], 1<=i <K, is equal (modulo M) to C' multiplied by a number BB[i] according to formula (2):

$$BB[i] = B[1]\ B[2]\ \ldots\ B[i]\ \underbrace{000\ \ldots\ 000}_{L[i+1]} \quad (2)$$

For generality, BB[0]=0, B[K+1]=0, and BB[K]=BB[K+1]=B, because L[K+1]=L[K+2]=0. Each of steps S[i] thus receives as inputs B[i], C', and X[i−1]=C'*BB[i−1] (mod M), and generates as output X[i]=C'*BB[i] (mod M). The product C'*BB[i] is given by formula (3):

$$C' * BB[i] = C' * (BB[i-1] + B[i]) * 2^{L[i+1]} \quad (3)$$
$$= (X[i-1] + C' * B[i]) * 2^{L[i+1]} \pmod{M}$$

Each of steps S[i], i=1 to K, may be performed by the following algorithm:

(A) compute $T1[i]=C'*B[i]$; (4)

(B) compute T2[i]=X[i−1]+T1[i], where

X[0]=0, therefore T2[1] equals T1[1] and has a width of N' bits, for 1<i <K, T2[i] has a width of (1+max(N'+L[i],R1)) bits, and T2[K] has a width of (1+max(N'+L[K−1],R2)) bits;

(C) left shift T2[i] by L[i+1] bits, where the bit width of the result $T2[i]*2^{L[i+1]}$ is denoted by LL[i]; T2[K] is shifted by zero since L[K+1]=0;

(D) convert the result $T2[i]*2^{L[i+1]}$ to a number X[i] having a smaller bit width of R1, R2, R3, or N' with the same value modulo M.

Step S[K+1] contains only computation (D) in algorithm (4).

Computation (D) may be implemented, for example, by splitting the LL[i]-bit number $T2[i]*2^{L[i+1]}$ into two pieces according to equation (5) as follows:

$$T2[i]*2^{L[i+1]}=T3[i]*2^{n[i]}+T4[i] \quad (5)$$

where T3[i] has a bit width of LL[i]−n[i], and T4[i] has a bit width of n[i]. Steps S[2] through S[K−2] are identical, so that n[2]= ... =n[K−2]. Accordingly, the factor $2^{n[i]}$ in equation (5) may be replaced by an appropriate pre-computed N-bit number D[i], where D[1]=D1, D[2]= ... =D[K−2]=D2, D[K−1]=D3, D[K]=D4. Equation (5) may then be expressed as equation (6):

$$T2[i]*2^{L[i+1]}=T3[i]*D[i]+T4[i] \pmod{M} \quad (6)$$

In this example, T5[i]=T3[i]*D[i] has LL[i]−n[i]+N bits, and the total sum, that is, X[i], has a bit width of no more than (1+max(LL[i]−n[i]+N,n[i])).

Figure 1:
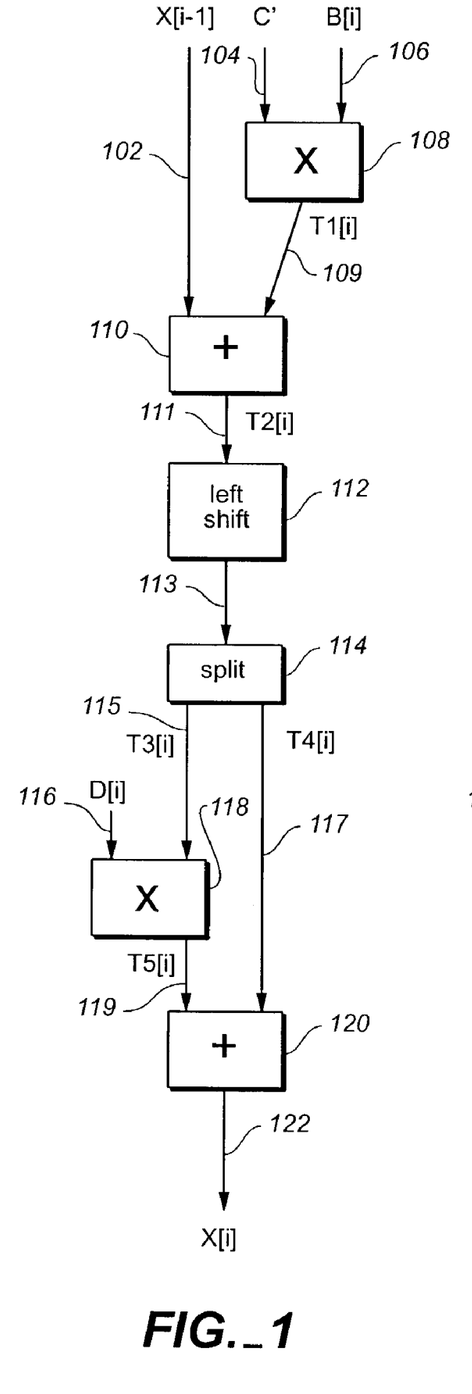
FIG. 1 illustrates a schematic diagram of the interaction of variables and calculations executed during one step S[i], i=1, . . . , K+1 in the operator mul(B',C',M) according to an embodiment of the present invention.

FIG. 1 illustrates a schematic diagram of the interaction of variables and calculations executed during one step S[i], i=1, ..., K+1 in the operator mul(B',C',M) according to an embodiment of the present invention. Shown in FIG. 1 are X[i−1] data 102, C' data 104, B[i] data 106, a first multiplier 108, T1[i] data 109, a first adder 110, T2[i] data 111, a shifter 112, a shifter output 113, a splitter 114, T3[i] data 115, T4[i] data 117, D[i] data 116, a second multiplier 118, T5[i] data 119, a second adder 120, and X[i] data 122.

The X[i−1] data 102 is generated by the previous iteration of step (D) in algorithm (4). The first multiplier 108 generates the T1[i] data 109 as the product of the C' data 104 and the B[i] data 106 in step (A) of algorithm (4). The first adder 110 generates the sum of the X[i−1] data 102 and the T1[i] data 109 to generate the T2[i] data 111 in step (B). The shifter 112 left shifts the T2[i] data 111 to generate the product $T2[i]*2^{L[i+1]}$ at the shifter output 113 in step (C). The splitter 114 splits the shifter output 113 into two pieces, the T3[i] data 115 having a bit width of LL[i]−n[i], and the T4[i] data 117 having a bit width of n[i]. The second multiplier 118 generates the T5[i] data 119 by multiplying the pre-computed D[i] data 116 by the T3[i] data 115 in step (D). The second adder 120 generates the output X[i] data 122 from the sum of the T5[i] data 119 and the T4[i] data 117.

Figure 2:
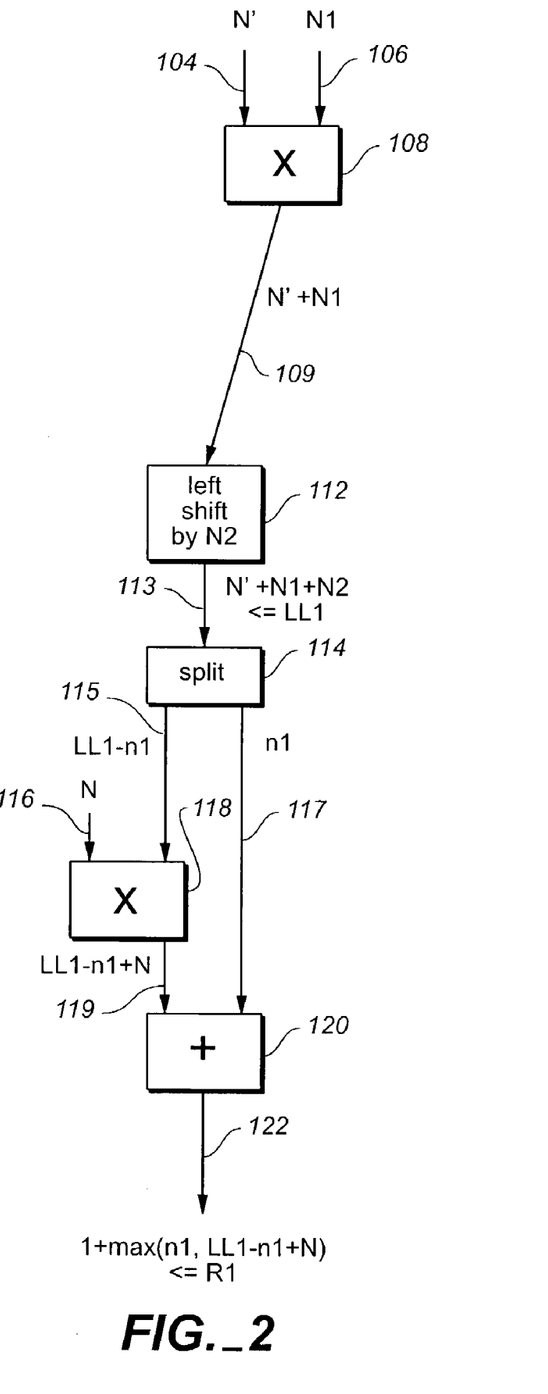
FIG. 2 illustrates a schematic diagram of corresponding bit widths of the variables in FIG. 1 for step S1.

FIG. 2 illustrates a schematic diagram of corresponding bit widths of the variables in FIG. 1 for step S1. In FIG. 2, the X[i−1] data 122 equals zero, so no first adder is required. The bit width of the output X[1] is (1+max(n1,LL1−n1+N)).

Figure 3:
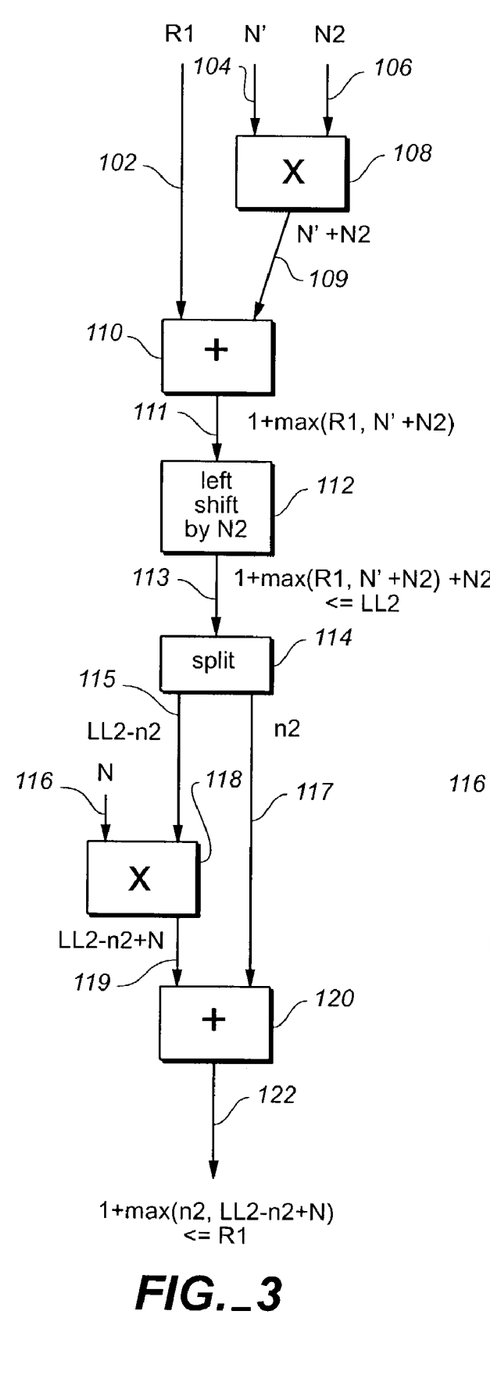
FIG. 3 illustrates a schematic diagram of corresponding bit widths of the variables in FIG. 1 for steps S[2] through S[K−2]

FIG. 3 illustrates a schematic diagram of corresponding bit widths of the variables in FIG. 1 for steps S[2] through S[K−2]. The bit width of the outputs X[2], ..., X[K−2] is (1+max(n2,LL2−n2+N)).

Figure 4:
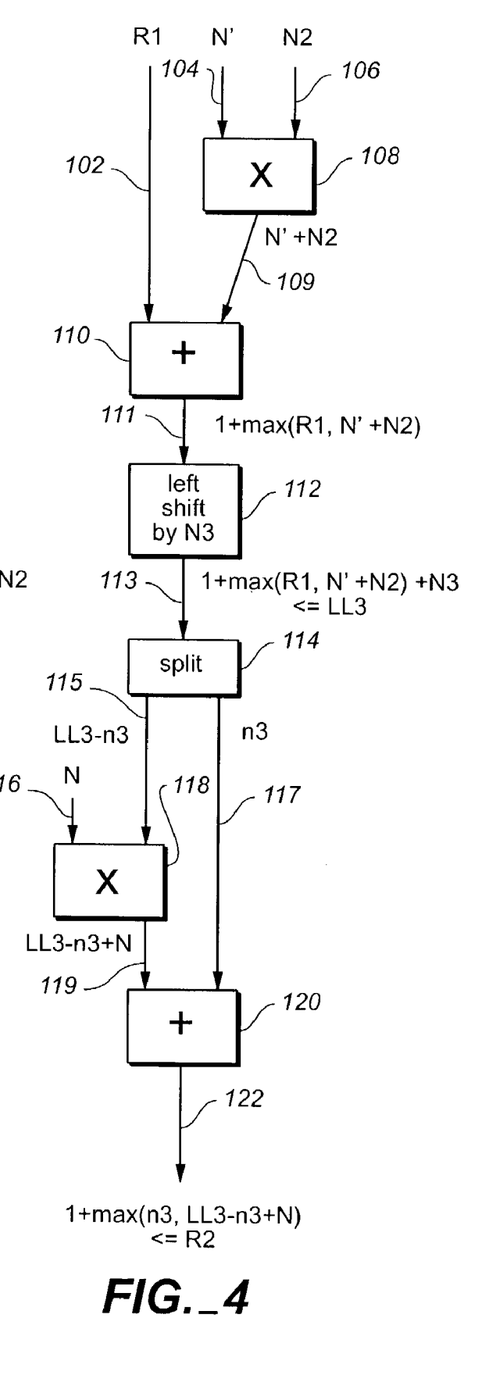
FIG. 4 illustrates a schematic diagram of corresponding bit widths in FIG. 1 of the variables for step S[K−1]

FIG. 4 illustrates a schematic diagram of the corresponding bit widths in FIG. 1 of the variables for step S[K−1]. The bit width of the output X[K−1] is (1+max(n3,LL3−n3+N)).

Figure 5:
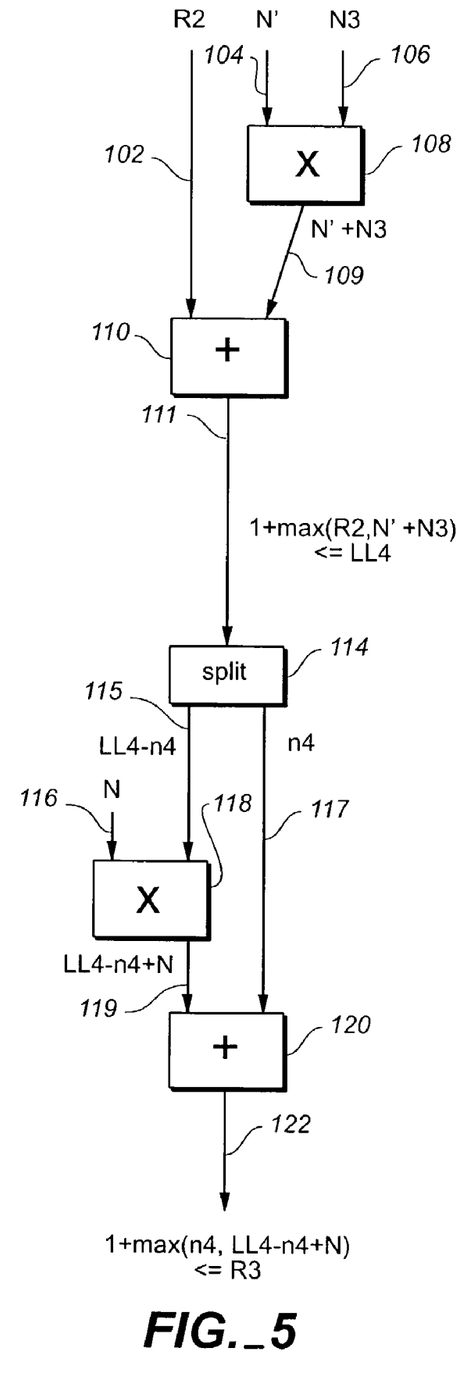
FIG. 5 illustrates a schematic diagram of corresponding bit widths of the variables in FIG. 1 for step S[K]

FIG. 5 illustrates a schematic diagram of the corresponding bit widths of the variables in FIG. 1 for step S[K]. In FIG. 5, the shift index L[K+1] equals zero, so no shifter is required. The bit width of the output X[K] is (1+max(n4, LL4−n4+N)).

Figure 6:
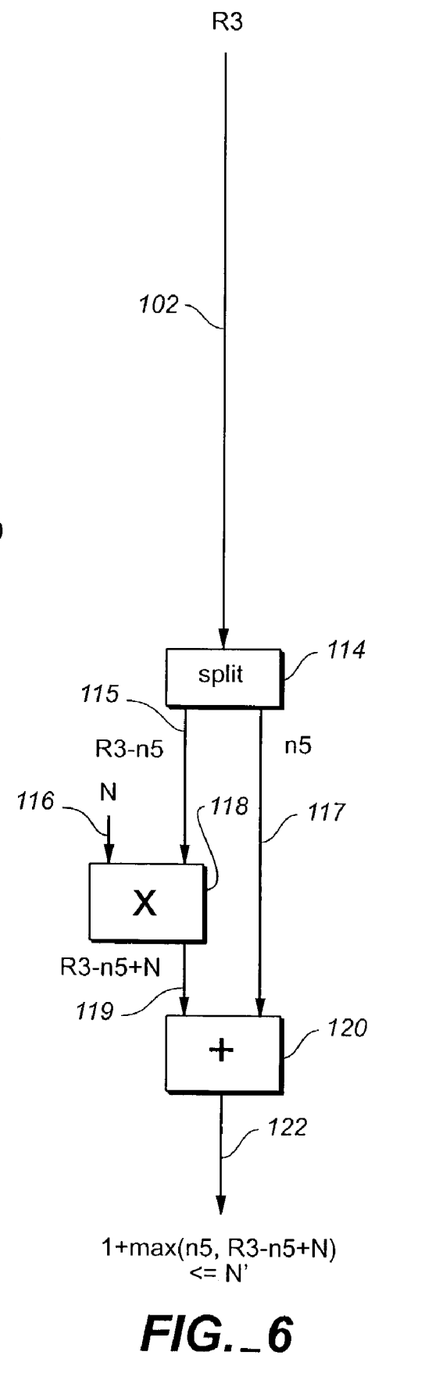
FIG. 6 illustrates a schematic diagram of corresponding bit widths of the variables in FIG. 1 for step S[K+1]

FIG. 6 illustrates a schematic diagram of the corresponding bit widths of the variables in FIG. 1 for step S[K+1]. In FIG. 6, the first adder and the first multiplier are not required. The bit width of the output X[K+1], that is, the output of the operator mul(B',C',M), is (1+max(n5,R3−n5+N)).

LL1, LL2, LL3, and LL4 are not actual variable bit widths, rather upper bounds for these bit widths that are included as a tool for later analysis of the variable bit widths. Algorithm (4) may be implemented subject to the constraints listed below in Table 1.

TABLE 1

| | CONSTRAINT |
|---|---|
| 1 | N' ≧ N |
| 2 | N' = N1 + (K − 2) * N2 + N3 |
| 3 | N1 ≧ 1 |
| 4 | N2 ≧ 1 |
| 5 | N3 ≧ 1 |
| 6 | N' + N1 + N2 ≦ LL1 |
| 7 | 1 + max(R1, N' + N2) + N2 ≦ LL2 |
| 8 | 1 + max(R1, N' + N2) + N3 ≦ LL3 |
| 9 | 1 + max(R2, N' + N3) ≦ LL4 |
| 10 | 1 ≦ n1 ≦ LL1 − 1 |
| 11 | 1 ≦ n2 ≦ LL2 − 1 |
| 12 | 1 ≦ n3 ≦ LL3 − 1 |
| 13 | 1 ≦ n4 ≦ LL4 − 1 |
| 14 | 1 ≦ n5 ≦ R3 − 1 |
| 15 | 1 + max(n1, LL1 − n1 + N) ≦ R1 |
| 16 | 1 + max(n2, LL2 − n2 + N) ≦ R1 |
| 17 | 1 + max(n3, LL3 − n3 + N) ≦ R2 |
| 18 | 1 + max(n4, LL4 − n4 + N) R3 |
| 19 | 1 + max(n5, R3 − n5 + N) ≦ N' |

In a hardware implementation of algorithm (4), the most critical parameter is the bit width of each of the multiplier inputs. If M1 and M2 are upper bounds for the bit widths of the left and right inputs of the multipliers, then the constraints apply shown in Table 2 below:

TABLE 2

| | CONSTRAINT |
|---|---|
| 1 | N' ≦ M1 |
| 2 | N1 ≦ M2 |
| 3 | N2 ≦ M2 |
| 4 | N3 ≦ M2 |
| 5 | N ≦ M1 |
| 6 | LL1 − n1 ≦ M2 |
| 7 | LL2 − n2 ≦ M2 |
| 8 | LL3 − n3 ≦ M2 |
| 9 | LL4 − n4 ≦ M2 |
| 10 | R3 − n5 ≦ M2 |

M1 equals N' and therefore may not be significantly reduced. The value of M2 is preferably minimized under the constraints in Table 1 and Table 2, where N and K are given while the remaining variables may be changed.

The constraints of Table 1 and Table 2 may be rewritten by expanding the "max" terms as in Table 3 below:

TABLE 3

| | CONSTRAINT |
|---|---|
| 1 | N' ≧ N |
| 2 | N' = N1 + (K − 2) * N2 + N3 |
| 3 | 1 ≦ N1 ≦ M2 |
| 4 | 1 ≦ N2 ≦ M2 |
| 5 | 1 ≦ N3 ≦ M2 |
| 6 | N' + N1 + N2 ≦ LL1 |
| 7 | 1 + R1 + N2 ≦ LL2 |
| 8 | 1 + R1 + N3 ≦ LL3 |
| 9 | 1 + R2 ≦ LL4 |
| 10 | 1 + N' + 2 * N2 ≦ LL2 |
| 11 | 1 + N' + N2 + N3 ≦ LL3 |
| 12 | 1 + N' + N3 ≦ LL4 |
| 13 | 1 ≦ n1 ≦ LL1 − 1 |
| 14 | 1 ≦ n2 ≦ LL2 − 1 |
| 15 | 1 ≦ n3 ≦ LL3 − 1 |
| 16 | 1 ≦ n4 ≦ LL4 − 1 |
| 17 | 1 ≦ n5 ≦ R3 − 1 |
| 18 | 1 + n1 ≦ R1 |
| 19 | 1 + n2 ≦ R1 |
| 20 | 1 + n3 ≦ R2 |
| 21 | 1 + n4 ≦ R3 |
| 22 | 1 + n5 ≦ N' |
| 23 | 1 + LL1 + N ≦ R1 + n1 |
| 24 | 1 + LL2 + N ≦ R1 + n2 |
| 25 | 1 + LL3 + N ≦ R2 + n3 |
| 26 | 1 + LL4 + N ≦ R3 + 4 |
| 27 | 1 + R3 + N ≦ N' + n5 |
| 28 | LL1 ≦ M2 + n1 |
| 29 | LL2 ≦ M2 + n2 |
| 30 | LL3 ≦ M2 + n3 |
| 31 | LL4 ≦ M2 + n4 |
| 32 | R3 ≦ M2 + n5 |

If N>2K, then the minimum possible value of M2 may be found from the following solution of the system of Table 3 given in Table 4 below:

TABLE 4

| | SOLUTION FOR N > 2 K |
|---|---|
| 1 | N1 = W + 2 |
| 2 | N2 = W |
| 3 | N3 = W + 2 |
| 4 | M2 = W + 2 |
| 5 | n1 = (K + 1) * W + 4 |
| 6 | n2 = (K + 1) * W + 4 |
| 7 | n3 = (K + 1) * W + 6 |
| 8 | n4 = 2 * K * W − N + 5 |
| 9 | n5 = K * W + 3 |
| 10 | LL1 = (K + 2) * W + 6 |
| 11 | LL2 = (K + 2) * W + 6 |
| 12 | LL3 = (K + 2) * W + 8 |
| 13 | LL4 = (K + 1) * W + 8 |
| 14 | R1 = (K + 1) * W + 5 |
| 15 | R2 = (K + 1) * W + 7 |
| 16 | R3 = 2 * K * W − N + 6 |
| 17 | N' = K * W + 4 |

In Table 4, W=](3N−2)/(3K−1) [, where ]X[ means "X rounded up to the nearest integer". The operator mul may be implemented in 2K+1 sequential steps, where each step requires a calculation of submul(P,Q,R) having the form P+Q*R. The bit widths of the multiplicands Q and R are approximately 3N/(3K−1) and 3K*N/(3K−1). Ignoring the term (−1), the bit widths required for implementing the multiplier are approximately 3N/3K=N/K and 3KN/3K=N.

Figure 7:
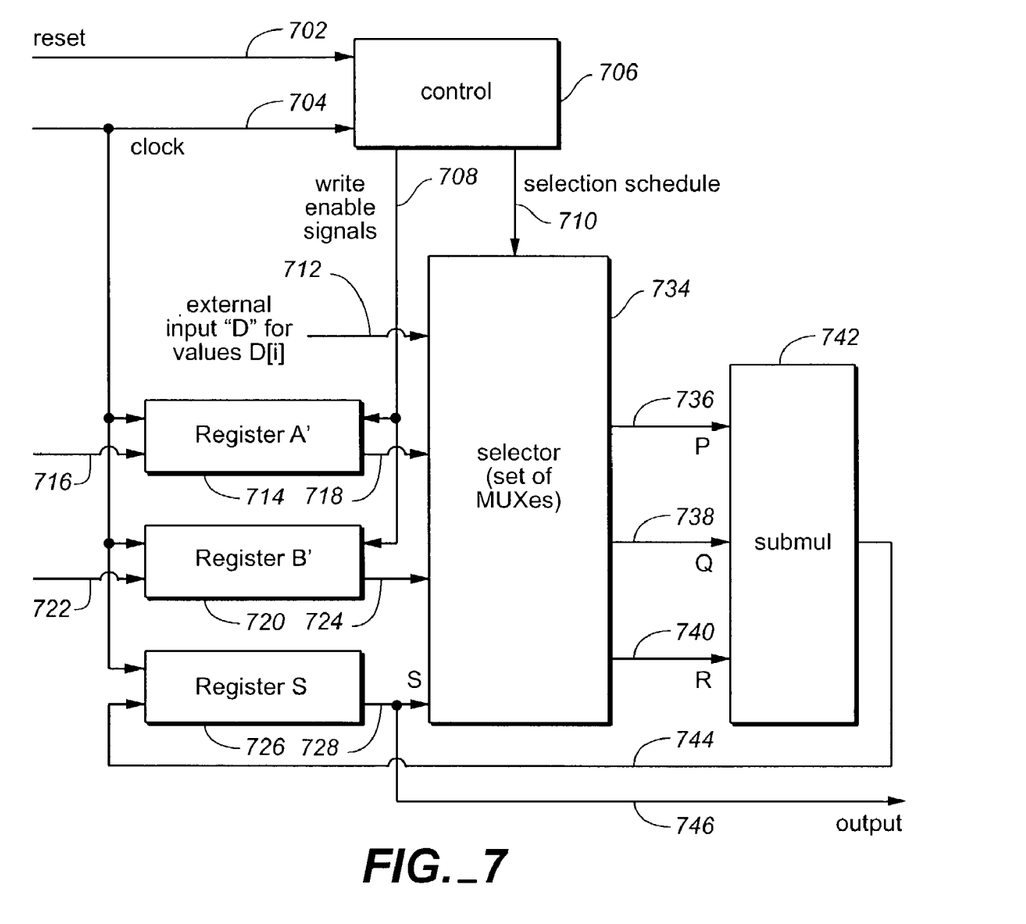
FIG. 7 illustrates a schematic diagram of a circuit of the operator mul(B',C',M) for performing synthesized modular multiplication according to an embodiment of the present invention.

FIG. 7 is a schematic diagram of a circuit 700 of the operator mul(B',C',M) for performing synthesized modular multiplication according to an embodiment of the present invention. Shown in FIG. 7 are a reset signal 702, a clock signal 704, a controller 706, write enable signals 708, a selection schedule signal 710, "D" data 712, a "C'" register 714, "C'" data 716, a "C'" register output 718, a "B'" register 720, "B'" data 722, a "B'" register output 724, an "S" register 726, an "S" register output 728, a multiplexer 734, "P" data 736, "Q" data 738, "R" data 740, a sub-multiplier 742, a sub-multiplier output 744, and a "mul" output 746.

To simplify referencing in the figures, indicia are used interchangeably for signals and their connections. The reference 702 thus represents both the reset signal and the reset line.

The controller 706 and the multiplexer 734 provide appropriate inputs to the sub-multiplier 744 as follows. Initially, after the reset signal 702 is asserted, the N'-bit numbers C' and B' are loaded from the "C'" data 716 into the "C'" register 714 and from the "B'" data 722 into the "B'" register 720. The sub-multiplier output 744 is fed back to the "S" register 726. The calculation completes in 2K+1 clock cycles using pre-computed values of D[i]. The "mul" output 746 is the N'least significant bits of the "S" signal 728.

The sequence performed by the controller 706 for selecting the "P" data 736, the "Q" data 738, and the "R" data 740 for the sub-multiplier 742 is illustrated in Table 5 below:

TABLE 5

| CLOCK CYCLE | P | Q | R | STEP |
|---|---|---|---|---|
| 1 | 0 | B[1] | C' | S[1] |
| 2 | S[n1 − 1:0]<<N2 | S>>n1 | D1 | S[1] |
| 3 | S | B[2] | C' | S[2] |
| 4 | S[n2 − 1:0]<<N2 | S>>n2 | D2 | S[2] |
| 5 | S | B[3] | C' | S[3] |
| 6 | S[n2 − 1:0]<<N2 | S>>n2 | D2 | S[3] |
| . | . | . | . | . |
| . | . | . | . | . |
| . | . | . | . | . |
| 2K − 5 | S | B[K − 2] | C' | S[K − 2] |
| 2K − 4 | S[n2 − 1:0]<<N2 | S>>n2 | D2 | S[K − 2] |
| 2K − 3 | S | B[K − 1] | C' | S[K − 1] |
| 2K − 2 | S[n3 − 1:0]<<N3 | S>>n3 | D3 | S[K − 1] |
| 2K − 1 | S | B[K] | C' | S[K] |
| 2K | S[n4 − 1:0] | S>>n4 | D4 | S[K] |
| 2K + 1 | S[n5 − 1:0] | S>>n5 | D5 | S[K + 1] |

In Table 5, B[1], ..., B[K] each represent a piece, that is, a selected number of bits (N1, N2, or N3), of the "B'" register output 724. S[x:0] represents the bits in selected bit positions x, (x−1), ..., 0 of the number S, where the least significant bit position is indexed by zero. The expression x>>y means the value of x divided by $2^y$, that is, shifted right by y bits, and x<<y means the value of x multiplied by $2^y$, that is, shifted left by y bits. Steps S[2] through S[K−2] are identical except that a different piece of the "B'" register output 724 is used in each clock cycle, and the value of the "S" register output 728 changes with each clock cycle.

The circuit of FIG. 7 may also include the capability of computing D[i] internally and the full modular reduction of the output X="mul" output 746, that is, converting the N'-bit value of X to an N-bit value. The conversion has, in general, multiple steps. Each of the steps starts from the Z-bit input (Z<=N') and produces an output having fewer bits; the bit width of the last output must equal N. One step of this reduction sequence, starting with a Z-bit value X, where N<Z<=N' and the most significant bit of M equals one, may be implemented as follows.

If the difference Z−N is small, for example, if Z−N<=5, then the most significant (Z−N+1) bits of M and X, denoted respectively by M' and X', may be used to find an (Z−N+1)-bit integer R such that:

$$X/M \geq R > X/M - 2 \qquad (7)$$

R may then be used to calculate the formula:

$$X1 = X - R*M \qquad (8)$$

Since X (mod M)=X1 (mod M) and 0<=X1<2M, the final value of X (mod M) may be calculated from the formula:

$$X \pmod{M} = X1 - M \quad \{\text{if } X1 \geq M\} \qquad (9)$$
$$= X1 \quad \{\text{if } X1 < M\}$$

The bit widths of X, M, and X (mod M) are respectively equal to Z, N, and N. The calculation of formula (9) is referred to later as CASE1(X,M).

If the difference Z−N is not small, for example, if Z−N>5, then an integer D may be selected according to the formula:

$$D = 2^n \pmod{M} \qquad (10)$$

where:

$$N+2<=n<=Z-2 \qquad (11)$$

D may then be used to calculate the value of X (mod M) from the formula:

$$X \pmod{M} = (X1*D + X2) \pmod{M} \qquad (12)$$

where X1=X>>n and X2=X[n−1:0]. The bit widths of X1 and X2 are respectively equal to Z−n and n, and the value of (X1*D+X2) has no more than 1+max(Z−n+N,n) bits. The condition (11) ensures that the value of (X1*D+X2) is less than Z, that is, the calculation of X (mod M) may be reduced to the same problem with an input having a smaller bit width. The maximum width reduction is achieved if the values of (Z−n+N) and n are equal or only differ by one, that is, if n=(Z+N)/2. The bit widths of X, D, M, and X (mod M) are respectively Z, N, N, and N. The calculation of formula (12) is referred to later as CASE2(X, D, M).

Both formulas (8) and (12) used to calculate the value of X (mod M) have the form A+B*C or A−B*C, which may be performed by a slightly modified sub-multiplier 742 in FIG. 7. The computation of D[i] may be performed in a similar manner, because all D[i] have the form $2^n$ (mod M).

The following example shown in Table 8 below demonstrates a calculation of some variables in Table 4 using the values N=1024 and K=8.

TABLE 6

| W = = ] 3070/23 [ = 134 |
| n1 = K * W + W + 4 = 9 * 134 + 4 = 1210 |
| n2 = K * W + W + 4 = 9 * 134 + 4 = 1210 |
| n3 = K * W + W + 6 = 9 * 134 + 6 = 1212 |
| n4 = 2K * W − N + 5 = 16 * 134 − 1024 + 5 = 1125 |
| n5 = K * W + 3 = 8 * 134 + 3 = 1072 |
| N' = K * W + 4 = 8 * 134 + 4 = 1073 |

A set of values D(z,n) may be defined from formula (10) by the formula:

$$D(z,n) = 2^{N+n} \pmod{M} \qquad (13)$$

where D(z,n) is a (z+N)-bit number equal (modulo M) to $2^{N+n}$. The values for D[i] may be expressed in this notation as shown in Table 7 below.

TABLE 7

D1 = D(0,186)
D2 = D(0,186)
D3 = D(0,188)
D4 = D(0,101)
D5 = D(0,48)

The second input D=D(0,n) in the calculation of CASE2 (X,D,M) reduces D(i,j) to D(i',j'), where i'=max(1+n,1+i−n). The calculation of D1, D2, D3, D4, and D5 may be organized as shown in Table 8 below.

TABLE 8

D(0,4) = CASE1($2^{1024+4}$,M)
D(0,7) = CASE1(8*D(0,4),M)
D(8,13) = CASE2($2^{1024+13}$,D(0,7),M)
D(5,13) = CASE2(D(8,13),D(0,4),M)
D(0,13) = CASE1(D(5,13),M)
D(14,25) = CASE2($2^{1024+25}$,D(0,13),M)
D(8,25) = CASE2(D(14,25),D(0,7),M)
D(5,25) = CASE2(D(8,25),D(0,4),M)
D(0,25) = CASE1(D(5,25),M)
D(26,48) = CASE2($2^{1024+48}$,D(0,25),M)
D(14,48) = CASE2(D(26,48),D(0,13),M)
D(8,48) = CASE2(D(14,48),D(0,7),M)
D(5,48) = CASE2(D(8,48),D(0,4),M)
D(0,48) = CASE1(D(5,48),M) = D5
D(49,101) = CASE2($2^{53}$*D(0,48),D(0,48),M)
D(26,101) = CASE2(D(49,101 ),D(0,25),M)
D(14,101) = CASE2(D(26,101),D(0,13),M)
D(8,101) = CASE2(D(14,101),D(0,7),M)
D(5,101) = CASE2(D(8,101),D(0,4),M)
D(0,101) = CASE1(D(5,101),M) = D4
D(49,186) = CASE2($2^{87}$*D(0,101),D(0,48),M)
D(26,186) = CASE2(D(49,186),D(0,25),M)
D(14,186) = CASE2(D(26,186),D(0,13),M)
D(8,186) = CASE2(D(14,186),D(0,7),M)
D(5,186) = CASE2(D(8,48),D(0,4),M)
D(0,186) = CASE1(D(5,186),M) = D1 = D2
D(0,188) = CASE1(4*D(0,186),M) = D3

The modular reduction of X, that is, the N'-bit "mul" output 746, to an N-bit number for the example illustrated is performed by the calculations shown in Table 9 below.

TABLE 9

| | SIGNIFICANT BITS |
|---|---|
| X1 = CASE2(X,D(0,25),M) | 1024 + 26 |
| X2 = CASE2(X1,D(0,13),M) | 1024 + 14 |
| X3 = CASE2(X2,D(0,7),M) | 1024 + 8 |
| X4 = CASE2(X3,D(0,4),M) | 1024 + 5 |
| X5 = CASE1(X4,M) | 1024 |

The number of calculations in the final modular reduction depends on the value of W, that is, N/K, and is proportional to log W. The number of steps in the pre-computation of D1, . . . , D5, which need only be performed a single time for selected values of N and K, is proportional to (log W)$^2$. The algorithm described above for the pre-computation of D1, . . . , D5 preferably includes storing approximately (log W) values of the form D(0,n). These values, as well as the values of D1, . . ., D5 may be saved in a memory block capable of storing about (log W) words of length N.

Figure 8:
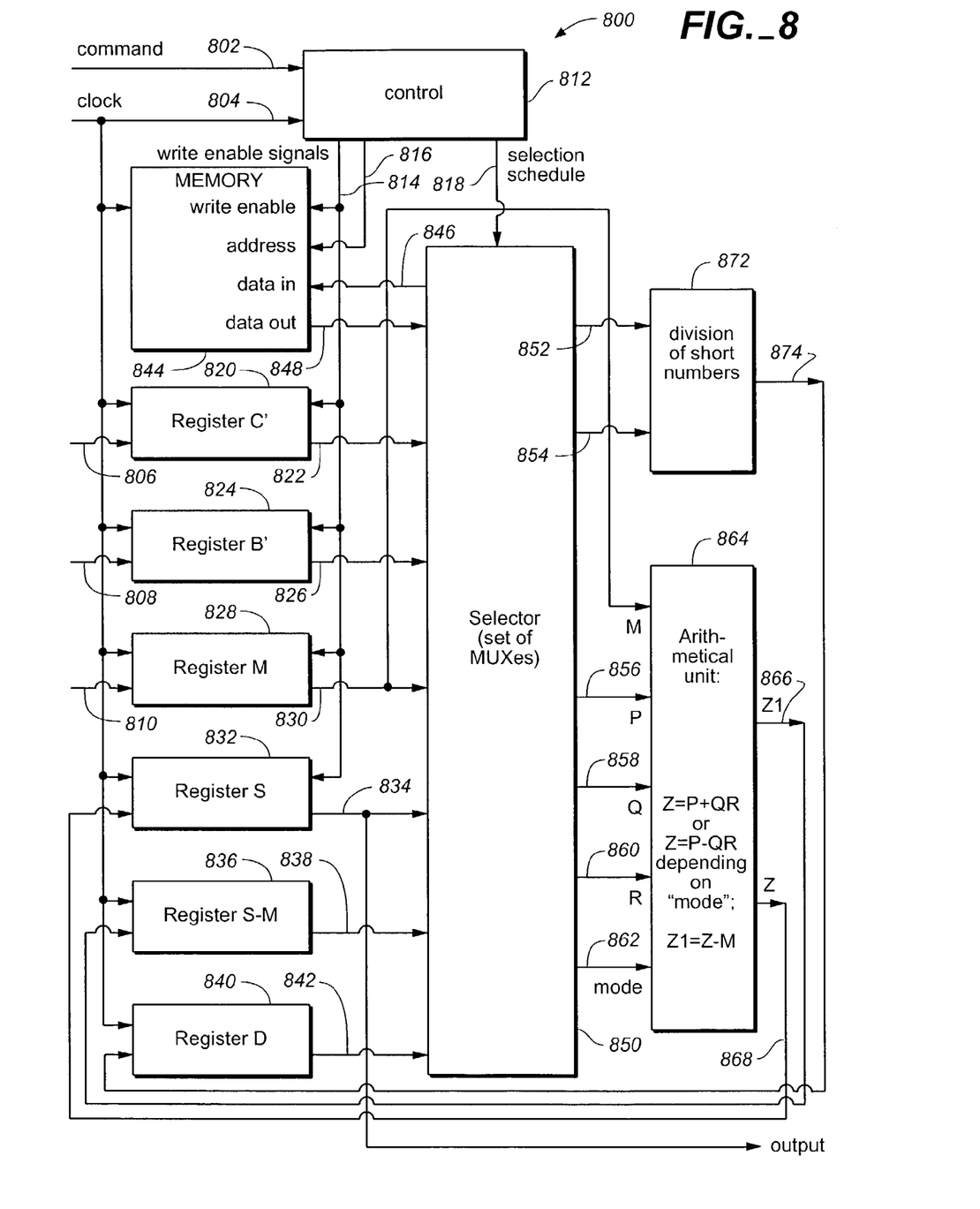
FIG. 8 illustrates a schematic diagram of a modular multiplication processor with self-contained pre-computation of all intermediate values and final modular reduction according to an embodiment of the present invention.

FIG. 8 is a schematic diagram of a modular multiplication processor 800 with self-contained pre-computation of all intermediate values and final modular reduction according to an embodiment of the present invention. Shown in FIG. 8 are a command signal 802, a clock signal 804, "C'" data 806, "B'" data 808, "M" data 810, a controller 812, write enable signals 814, address signals 816, a selection schedule signal 818, a "C'" register 820, a "C'" register output 822, a "B'" register 824, a "B'" register output 826, an "M" register 828, an "M" register output 830, an "S" register 832, an "S" register output 834, an "S-M" register 836, an "S-M" register output 838, a "D" register 840, a "D" register output 842, a memory 844, a memory data input 846, a memory data output 848, a multiplexer 850, divisor data 852, dividend data 854, "P" data 856, "Q" data 858, "R" data 860, a mode signal 862, an arithmetic unit 864, "Z1" data 866, "Z" data 868, a divider 872, and "D" data 874.

The controller 812 coordinates the operation of the memory 844, the registers 820, 824, 828, 832, 836, and 840, the multiplexer 850, the divider 872, and the arithmetic unit 864 in response to the command signal 802.

The registers 820, 824, 828, 832, 836, and 840 hold the appropriate values of their corresponding parameters for selection by the multiplexer 850.

The multiplexer 850 selects the appropriate values from the memory data output 848 and registers 820, 824, 828, 832, 836, and 840 in response to the selection schedule signal 818 for performing operations having the form P+Q*R or P−Q*R as selected by the value of the mode signal 862, for dividing X'/M', and for storing pre-computed values into the memory 844.

The divider 872 performs the division X'/M'.

The arithmetic unit 864 calculates Z=P+Q*R or Z=P−Q*R according to the mode signal 862 and calculates Z1=Z−M. The value of Z1 is received by the "S-M" register 836.

The command signal 802 initiates one of three operations: pre-computation, synthesized modular multiplication, and final modular reduction. At least four separate commands are used to support these three functions as described below in Table 10.

TABLE 10

| COMMAND | ACTION |
|---|---|
| NOP | Continue the current calculation |
| PRE-COMPUTE | Load N-bit input value into the "M" register and intialize pre-computation. |
| MULTIPLY | Load N'-bit input values into the "C'" and "B'" registers and intialize synthetic modular multiplication. |
| REDUCE | Initiate final modular reduction of the value stored in the "S" register. |

If no calculation is currently in progress, the contents of the "S" register are held constant by the NOP function, for example, by setting P=S and Q=R=0 in the multiplexer 850.

The PRE-COMPUTE function loads the N-bit input value of M into the "M" register, computes the values of D(0,n) including D1, ..., D5 as described above with reference to Tables 8, 9, and 10. The pre-computed values are stored in the appropriate locations in memory 844 via the address signal 816 and the memory data input 846. The pre-computation function requires approximately $(\log W)^2$ clock cycles.

The MULTIPLY function loads the N'-bit values of C' and B' respectively into the "C'" register 820 and the "B'" register 824, performs the synthetic modular multiplication as described with reference to FIG. 7, and retrieves the appropriate values of D[i] from the memory 844 via the address signal 816 and the memory data output 848.

The REDUCE function performs the modular reduction of the final value stored in the "S" register 832 as described above with reference to Table 11, which requires approximately $(\log W)$ clock cycles.

The modular multiplication processor of FIG. 8 may be applied to other algorithms for modular exponentiation to reduce expressions of the form $A^B$ mod M by appropriate arrangements of the functional blocks shown in the example of FIG. 8. Some of these algorithms, such as variants of sliding-window exponentiation, require a second memory for storing values of $A^n$ mod M for multiple values of n. A complete modular reduction is not necessary for the internally stored values, therefore they may be stored as N'-bit numbers.

Figure 9:
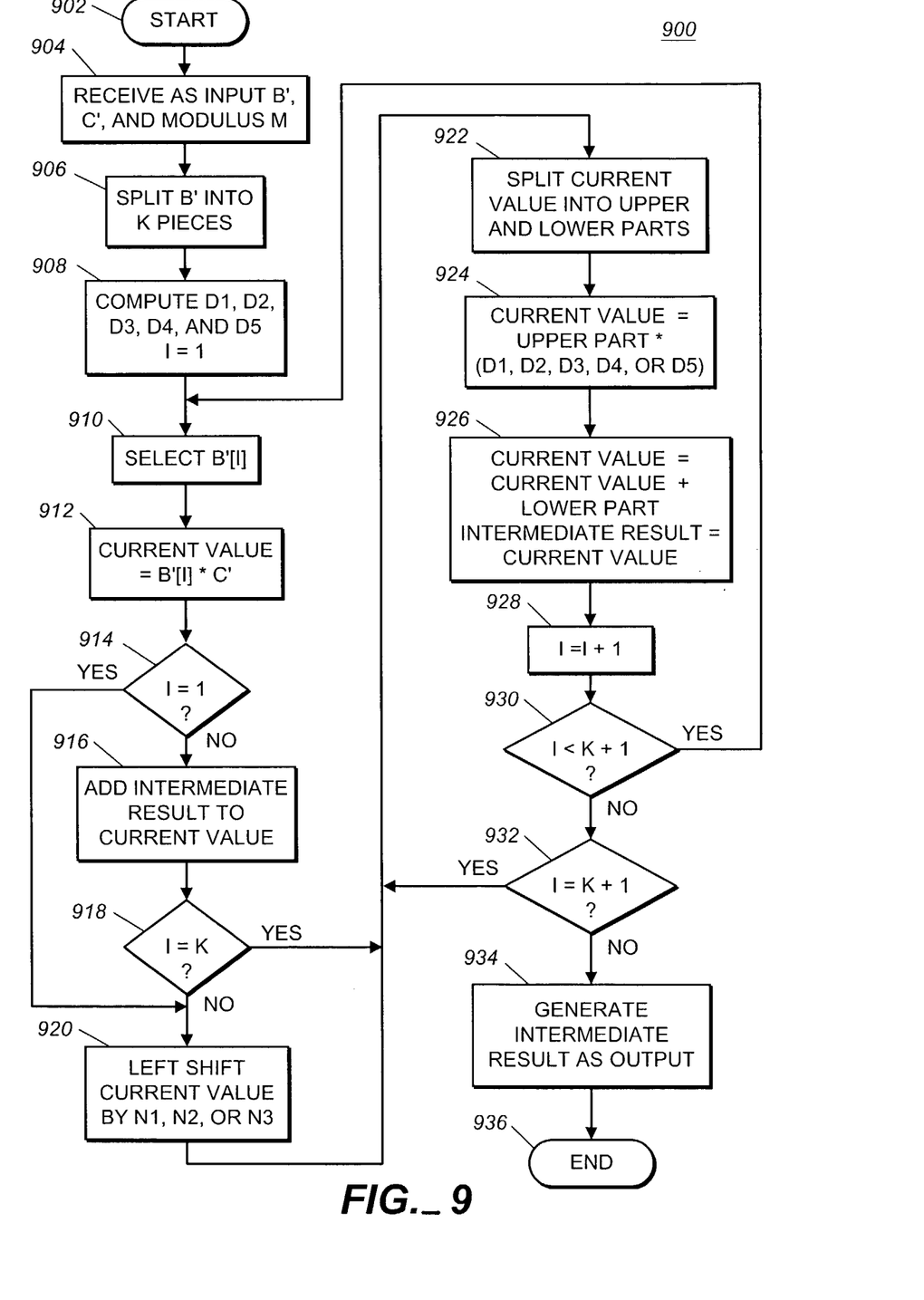
FIG. 9 illustrates a flow chart for the modular multiplication processor of FIG. 8.

FIG. 9 is a flow chart 900 for the modular multiplication processor of FIG. 8.

Step 902 is the entry point of the flow chart 900.

In step 904, the values of the numbers B' and C' having a bit width of N' and the modulus M are received as input.

In step 906, the first number B' is split into a sequence of a selected number of K pieces. Each of the pieces in the sequence has a selected bit width of N1, N2, or N3 as defined in Table 4.

In step 908, the constants D1, D2, D3, D4, and D5 are computed as described with reference to formula (13), and a loop index i is initialized to 1. An important feature of the present invention is that multiple multiplications using the same modulus M may be performed by a single calculation of the constants D1, D2, D3, D4, and D5. Because the calculation of the constants D1, D2, D3, D4, and D5 requires more clock cycles than the rest of the modular multiplication feature, a substantial processing time savings is realized by performing the calculation of the constants D1, D2, D3, D4, and D5 corresponding to the modulus M only once.

In step 910, the next (or first, if none previously selected) piece in the sequence of K pieces of the first number B' is selected.

In step 912, the selected piece is multiplied by C', and the product is stored in the current value.

In step 914, if i equals 1, then control is transferred to step 920. Otherwise, control is transferred to step 916.

In step 916, the intermediate result of step 926 is added to the current value.

In step 918, if i=K, then control is transferred to step 922. Otherwise, control is transferred to step 920.

In step 920, the current value is left shifted by N1 if i equals 1, by N3 if i equals K−1, otherwise by N2.

In step 922, the current value is split into a most significant upper part and a least significant lower part. The least significant lower part has a selected bit width of n1 if i equals 1, of n3 if i equals K−1, of n4 if i equals K, of n5 if i equals K+1, otherwise of n2. The remaining bits constitute the most significant upper part.

In step 924, the most significant upper part is multiplied by D1 if i equals 1, by D3 if i equals K−1, by D4 if i equals K, by D5 if i equals K+1, otherwise by D2, and the product is stored in the current value.

In step 926, the least significant lower part is added to the current value, and the current value is stored in the intermediate result.

In step 928, the loop index i is incremented by one.

In step 930, if i is less than K+1, then control is transferred back to step 910. Otherwise, control is transferred to step 932.

In step 932, if i is equal to K+1, then control is transferred back to step 922. Otherwise, control is transferred to step 934.

In step 934, the intermediate result is generated as the output of the modular multiplication processor.

Step 936 is the exit point of the flow chart 900.

Although the methods of the present invention illustrated by the flowchart descriptions above are described and shown with reference to specific steps performed in a specific order, these steps may be combined, sub-divided, or reordered without departing from the scope of the claims. Unless specifically indicated herein, the order and grouping of steps is not a limitation of the present invention.

In another embodiment of the present invention, a method of modular exponentiation includes receiving as input a first number, a second number, and a modulus for calculating a residue of a product of the first number times the second number modulo the modulus; partitioning the first number into a selected number of pieces; calculating a first product of one of the pieces times the second number; adding a previous intermediate result to the first product to generate a first sum; shifting the first sum by a selected number of bit positions to generate a second product; and reducing a bit width of the second product to generate an intermediate result wherein the intermediate result has a bit width that is less than a bit width of the second product and has a residue that is identical to a residue of the second product modulo the modulus.

While the invention herein disclosed has been described by means of specific embodiments and applications thereof, numerous modifications and variations could be made thereto by those skilled in the art without departing from the scope of the invention set forth in the following claims.

What is claimed is:

1. A modular exponentiation processor comprising:
   a controller for receiving a reset signal and a clock signal and for generating write enable signals and a selection schedule signal;
   a "C'" register for receiving "C'" input data;
   a "B'" register for receiving "B'" input data;
   an "S" register for receiving "S" intermediate data;
   a multiplexer for receiving "D" constant data, for selecting three of the "C'" register, the "B'" register, the "S" register, and the "D" constant data, and for generating as output the selected three of the "C'" register, the "B'" register, the "S" register, and the "D" constant data as "P" data, "Q" data, and "R" data respectively in response to the selection schedule signal; and
   a sub-multiplier for receiving the "P" data, the "Q" data, and the "R" data and for generating a sum of the "P" data plus a product of the "Q" data times the "R" data.

2. A modular exponentiation processor comprising:
  a controller for receiving a command signal and a clock signal and for generating address signals, write enable signals, and a selection schedule signal;
  a "C'" register coupled to the controller for receiving a first input number;
  a "B'" register for receiving a second input number;
  an "M" register for receiving a modulus for calculating a residue of the product of the first number times the second number;
  an "S" register for receiving an intermediate product;
  an "S-M" register for receiving the intermediate product minus the modulus;
  a "D" register for receiving a constant for calculating the intermediate product;
  a memory coupled to the controller for storing the constant;
  a multiplexer coupled to the controller for selecting a plurality of register outputs;
  an arithmetic unit coupled to the multiplexer for calculating the intermediate product; and
  a divider coupled to the multiplexer for calculating the constant.

3. The modular exponentiation processor of claim 2 wherein the controller coordinates the operation of the memory, the "C'" register, the "B'" register, the "M" register, the "S" register, the "S-M" register, the "D" register, the multiplexer, the divider, and the arithmetic unit in response to the command signal.

4. The modular exponentiation processor of claim 3 wherein the multiplexer selects appropriate values from the memory and the "C'" register, the "B'" register, the "M" register, the "S" register, the "S-M" register, and the "D" register for performing a multiply and add operation and for storing the constant into the memory.

5. The modular exponentiation processor of claim 4 wherein the arithmetic unit performs synthetic modular multiplication.

6. The modular exponentiation processor of claim 2 wherein the command signal initiates one of three functions: pre-compute, synthetic modular multiplication, and modular reduction.

7. The modular exponentiation processor of claim 6 wherein the pre-compute function loads the modulus into the "M" register, computes the constant, and stores the constant in the memory at a location selected by the address signals.

8. The modular exponentiation processor of claim 6 wherein the multiply function loads N'-bit values of C' and B' respectively into the "C'" register and the "B'" register, performs synthetic modular multiplication, and retrieves the appropriate values of the constant from the memory.

9. The modular exponentiation processor of claim 6 wherein the modular reduction function performs the modular reduction of a final value stored in the "S" register.

* * * * *